(12) United States Patent
Tucker (10) Patent No.: US 9,840,927 B2
(45) Date of Patent: Dec. 12, 2017

(54) ADDITIVE LAYER MANUFACTURING

(71) Applicant: ROLLS-ROYCE plc, London (GB)

(72) Inventor: Matthew D Tucker, Bristol (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 15/227,416

(22) Filed: Aug. 3, 2016

(65) Prior Publication Data

US 2017/0058685 A1    Mar. 2, 2017

(30) Foreign Application Priority Data

Aug. 24, 2015    (GB) .................................... 1514977.6

(51) Int. Cl.
*B22F 3/105* (2006.01)
*B28B 1/00* (2006.01)
(Continued)

(52) U.S. Cl.
CPC ............ *F01D 9/041* (2013.01); *B22F 3/1055* (2013.01); *B29C 67/0077* (2013.01); *B33Y 10/00* (2014.12); *B33Y 70/00* (2014.12); *B33Y 80/00* (2014.12); *F01D 5/187* (2013.01); *F01D 25/12* (2013.01); *B22F 5/04* (2013.01); *B22F 5/10* (2013.01); *B22F 2003/1059* (2013.01); *B22F 2999/00* (2013.01); *B28B 1/001* (2013.01);
(Continued)

(58) Field of Classification Search
None
See application file for complete search history.

(56) References Cited

U.S. PATENT DOCUMENTS 5,370,499 A    12/1994  Lee
5,490,882 A    2/1996   Sachs et al.
(Continued)

FOREIGN PATENT DOCUMENTS

EP    2947274 A1    11/2015
JP    2013-194263 A    9/2013
WO    2014/105108 A1    7/2014

OTHER PUBLICATIONS

Jan. 19, 2017 Extended Search Report issued in European Patent Application No. 16182606.0.
(Continued)

*Primary Examiner* — Mary F Theisen
(74) *Attorney, Agent, or Firm* — Oliff PLC (57) ABSTRACT

A method for the manufacture of a component having an internal cavity and an array of pedestals extending into the cavity includes; defining external and core geometries of the component; using a powder-bed additive layer manufacturing method, building the component from a plurality of layers laid on a first-plane; and removing excess powder from the core in a first powder extraction direction along the first-plane. The core geometry is adapted for improved powder removal; including a main core passage, an array of pedestals extending into the passage and passage wall extending from the first-plane, one or more pedestals coinciding with the passage wall, having a cross-section in a plane parallel to the first-plane which is altered with respect to the cross-section of non-coinciding pedestals to extend a face of the pedestal which faces away from the powder extraction direction to intersect the passage wall at an obtuse angle.

15 Claims, 6 Drawing Sheets

(51) Int. Cl.

| | | |
|---|---|---|
| *B33Y 10/00* | (2015.01) | |
| *F01D 25/12* | (2006.01) | |
| *F01D 9/04* | (2006.01) | |
| *B29C 67/00* | (2017.01) | |
| *B33Y 70/00* | (2015.01) | |
| *B33Y 80/00* | (2015.01) | |
| *B22F 5/04* | (2006.01) | |
| *B22F 5/10* | (2006.01) | |
| *F01D 5/14* | (2006.01) | |
| *F01D 5/18* | (2006.01) | |
| *F01D 5/28* | (2006.01) | |

(52) U.S. Cl.
CPC .............. *F01D 5/147* (2013.01); *F01D 5/18* (2013.01); *F01D 5/284* (2013.01); *F05D 2220/32* (2013.01); *F05D 2230/20* (2013.01); *F05D 2230/30* (2013.01); *F05D 2230/31* (2013.01); *F05D 2250/20* (2013.01); *F05D 2250/291* (2013.01); *F05D 2260/22141* (2013.01); *Y02P 10/295* (2015.11)

(56) References Cited

U.S. PATENT DOCUMENTS

| | | |
|---|---|---|
| 6,112,804 A | 9/2000 | Sachs et al. |
| 2011/0262695 A1 | 10/2011 | Lee et al. |
| 2013/0280091 A1 | 10/2013 | Propheter-Hinckley et al. |
| 2015/0097085 A1 | 4/2015 | Holemans |
| 2015/0345298 A1* | 12/2015 | Mongillo ............... F01D 5/187 60/755 |
| 2016/0356162 A1* | 12/2016 | Jones ..................... F01D 5/18 |

OTHER PUBLICATIONS

Feb. 25, 2016 Search Report issued in British Patent Application No. 1514977.6.

* cited by examiner

ADDITIVE LAYER MANUFACTURING

FIELD OF THE INVENTION

The present disclosure concerns the manufacture of components with complex internal geometries. More particularly the invention concerns manufacture of such components using additive layer manufacturing techniques.

BACKGROUND TO THE INVENTION

Additive layer manufacturing (ALM) methods are known. In these methods a component is built up layer by layer until the 3D component is defined. In some ALM methods, layers are created by selective treatment of layers within a mass of particulate material, the treatment causing cohesion of selected regions of particulates into a solid mass. For example, the particulate is a ferrous or non-ferrous alloy powder and the treatment involves local heating using a laser or electron beam. Specific examples of such ALM methods include (without limitation); laser sintering, laser melting and electron beam melting (EBM). Such methods are sometimes known as powder-bed ALM methods.

ALM techniques are known for use in defining complex geometries to high tolerances and can be used as an alternative to casting. However, such methods are not ideally suited to some conventionally used core geometries. For example, where the ALM process uses a bed of particulate material, it is necessary to remove all the untreated particulate from cavities in the defined component. This is more difficult than leeching and removing a more fluid core in a casting process. Adopting the same core geometries as in a casting method can result in un-treated particulate materials becoming stuck in the bottoms and corners of the core cavity. During subsequent heat treatments, these powders sinter in place altering the intended design of the component to the possible detriment of the performance of the component.

Cast components are often used in gas turbine engines to define complex aerodynamic shapes. The casting process and materials used provide materials with very specific mechanical properties which need to be preserved in an environment where they are exposed to extremes of temperature and pressure.

Hollow cavities are provided within these components and serve to minimise weight, reduce material costs and also provide a conduit through which coolant fluids can be delivered to cool the cast components ensuring that surfaces of the components do not exceed critical temperatures which would affect their mechanical integrity. It is known to include in these cavities arrays of pins or pedestals which increase surface areas of internal surfaces allowing more rapid heat exchange. Incomplete evacuation of core cavities in such designs can be detrimental to the performance of the end product and may lead to scrappage of parts at considerable expense to the manufacturer and so cannot be tolerated.

For optimum cooling efficiency, it is sometimes desirable to have pedestals across as wide an internal surface of the cavity as is available. In some known arrangements, pedestals coincide with cavity walls. Whilst beneficial for cooling, this presents a potential problem if a powder ALM method were to be used as an alternative method of manufacture of the component, since they present tight radii at the intersection with the wall which can lead to trapping of powder and the associated problems discussed above. Consequently, a component designed for powder ALM manufacture is typically simplified by removing or repositioning pedestals which would otherwise coincide with the cavity wall leaving a clear route adjacent the wall for the simple removal of excess powder.

STATEMENT OF THE INVENTION

According to a first aspect there is provided a method for the manufacture of a component having an internal cavity and an array of pedestals extending into the cavity, the method comprising;
defining an external geometry of the component,
defining a core geometry of the component;
using a powder bed additive layer manufacturing method, building the component from a plurality of layers laid on a first plane;
removing excess powder from the core in a first powder extraction direction along the first plane;
wherein the core geometry includes a main core passage, an array of pedestals extending into the passage from the first plane and a passage wall extending from the first plane, one or more pedestals coinciding with the passage wall, the pedestals in the array having a uniform cross-section in a plane parallel to the first plane except for the coinciding pedestals which have a cross-section in a plane parallel to the first plane which is altered with respect to the uniform cross-section of the non-coinciding pedestals to extend a face of the coinciding pedestal which faces away from the powder extraction direction so as to intersect the passage wall at an obtuse angle.

Excess powder is typically removed by turning the component such that a passage outlet faces downwards and then shaking, vibrating, patting or otherwise agitating the component so as to loosen the powder and evacuate it through the outlet. When a pedestal face facing away from the outlet meets the passage wall at an acute angle, powder can fall into the vertex of the acute angle and become trapped rather than evacuated through the outlet. By introducing an adapted face which meets the wall at an obtuse angle, the powder is encouraged to slip down the adapted face towards the outlet. At the same time the pedestal array is able to retain an optimal number and position of pedestals for cooling purposes.

The term "obtuse angle" in this context is intended to include angles from 90 degrees to 180 degrees inclusive. Preferably the obtuse angle exceeds 90 degrees, for example the obtuse angle is greater than 105 degrees, more preferably 135 degrees or greater.

The extended face of the pedestal may be planar. Alternatively, the extended face may be smoothly curved. The vertex of the angle at which the extended face intersects the passage wall may be rounded off.

Optionally, excess powder may be removed in a second direction and a second face of the coinciding pedestals which faces away from the second direction is also extended so as to intersect the passage wall at an obtuse angle. For example, the first and second powder removal directions are opposite to each other.

In one example, the pedestals are circular in cross-section. A passage wall intersects a circle leaving a portion greater than a semi-circle such that a pedestal face coinciding with the passage wall does so at an acute angle. In accordance with the invention, when defining the core geometry, these circular cross-sections are altered to extend a face from a bisector of the circle to coincide with the passage wall at an obtuse angle.

In another example, the pedestals are polygonal and have a face which meets the passage wall at an acute angle and the coinciding pedestals are altered such that a different face of the polygonal pedestal is extended.

The pedestals may extend orthogonally from the first plane. Optionally, the pedestals extend at an incline to the first plane.

For example, the component can be manufactured from a ferrous or non-ferrous alloy or a ceramic. The component may be a component for a gas turbine engine. For example (but without limitation) the component may comprise a turbine blade or a nozzle guide vane.

In another aspect, the invention comprises a gas turbine engine incorporating one or more components manufactured in accordance with the method of the invention.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE FIGURES

Embodiments will now be described by way of example only, with reference to the Figures, in which.

DETAILED DESCRIPTION OF THE FIGURES AND EMBODIMENTS

Figure 1:
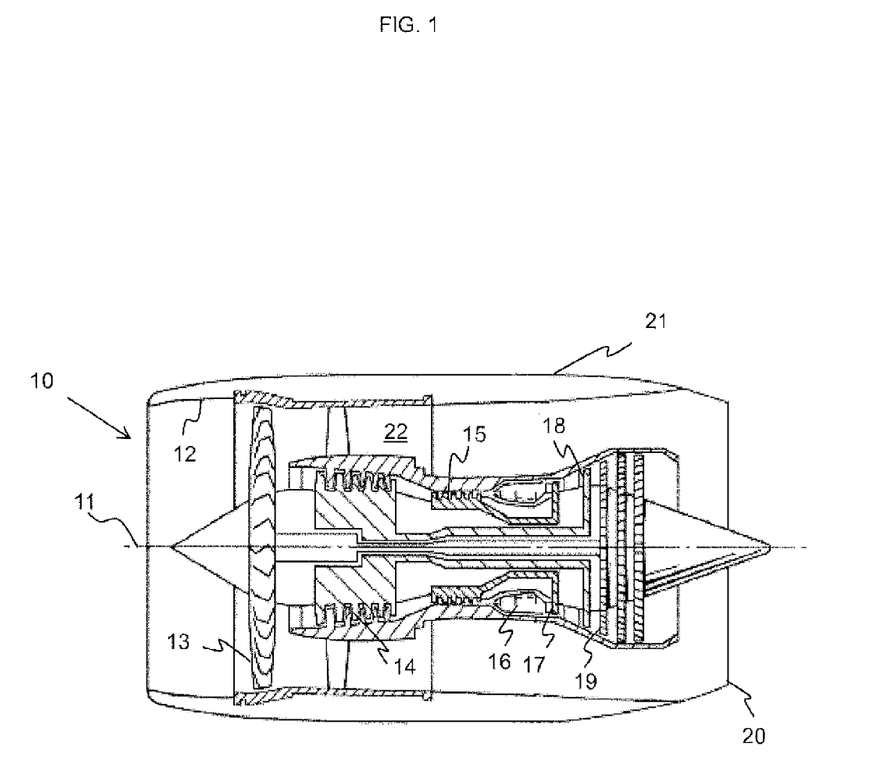
FIG. 1 is a sectional side view of a gas turbine engine which may comprise components made in accordance with the method of the invention.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Many components of the gas turbine engine are actively cooled during operation by the passage of compressor air which has by-passed the combustor through internal passages of the components. To facilitate rapid cooling, some passages are provided with pedestals which extend from a wall of the passage into the passage. Such components can conveniently be manufactured using the method of the invention. For example (but without limitation), components in the turbine sections 17, 18 and 19, or the combustor 16 may be manufactured in accordance with the invention.

Figure 2:
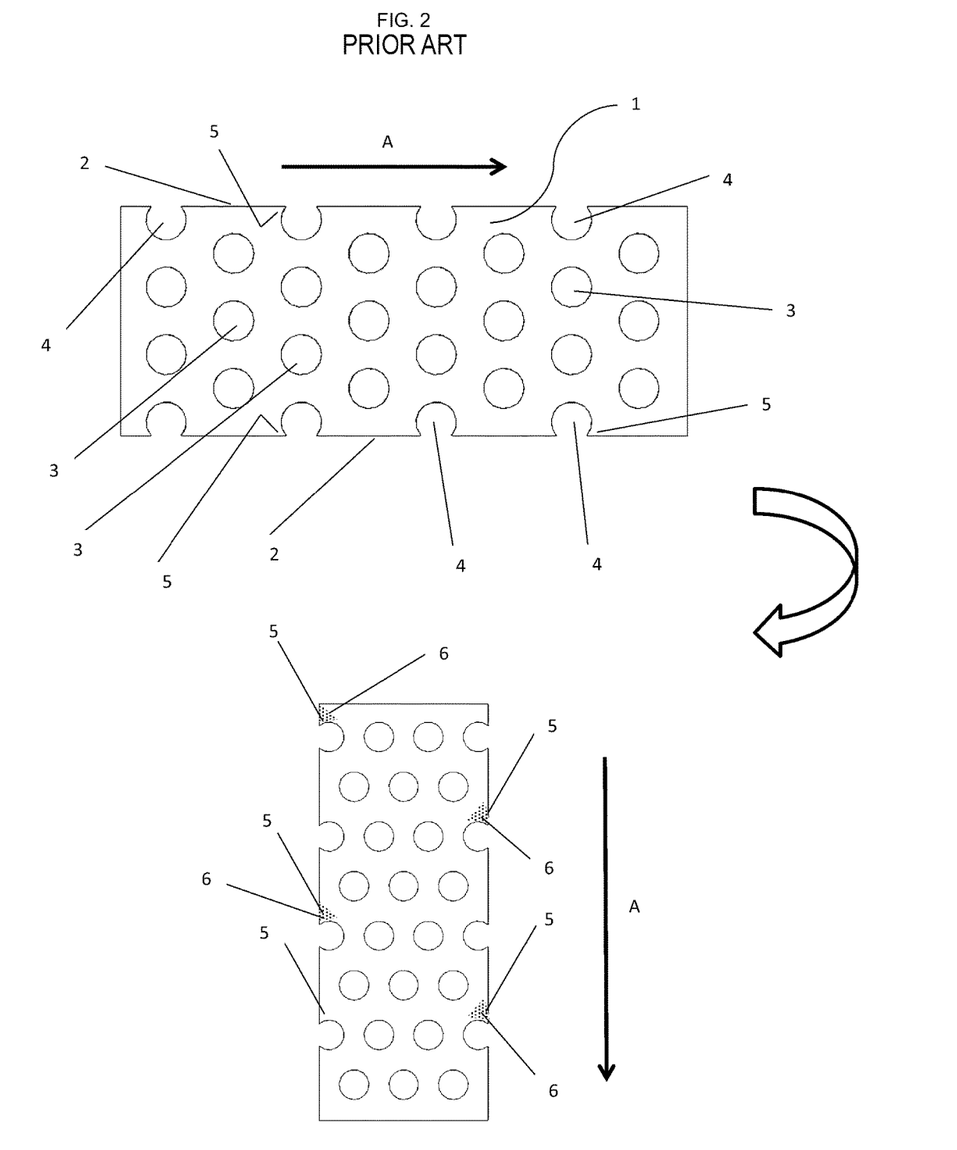
FIG. 2 shows in a first main core passage of a component having an array of pedestals as is known from the prior art.

FIG. 2 shows schematically the geometry of a main core passage of a component having an array of pedestals as is known from the prior art. It will be appreciated that the geometry is simplified compared to actual products which may comprise more complex shapes in three dimensions but nevertheless can benefit from manufacture in accordance with the invention. The arrangement is shown in first and second rotations, the second representing the passage when turned to remove excess material.

As can be seen a main core passage 1 is bounded by two parallel walls 2 which are arranged orthogonal to a plane on which the component might be built using a powder ALM method. Arrow A shows the direction in which powder would be removed in such a method. An array of pedestals 3, 4 consists of a first plurality 3 of pedestals with a complete circular cross section arranged in a central region of the passage 1, and a second plurality 4 which form incomplete circles (greater than semi-circles) which coincide with the walls 2. The second plurality of pedestals 4 intersect with the walls 2 at acute angles having vertices 5. In the lower Figure, it can be seen that, when the component is turned so as to allow powder removal in the direction of arrow A, powder 6 is prone to accrue in the vertices 5.

Figure 3:
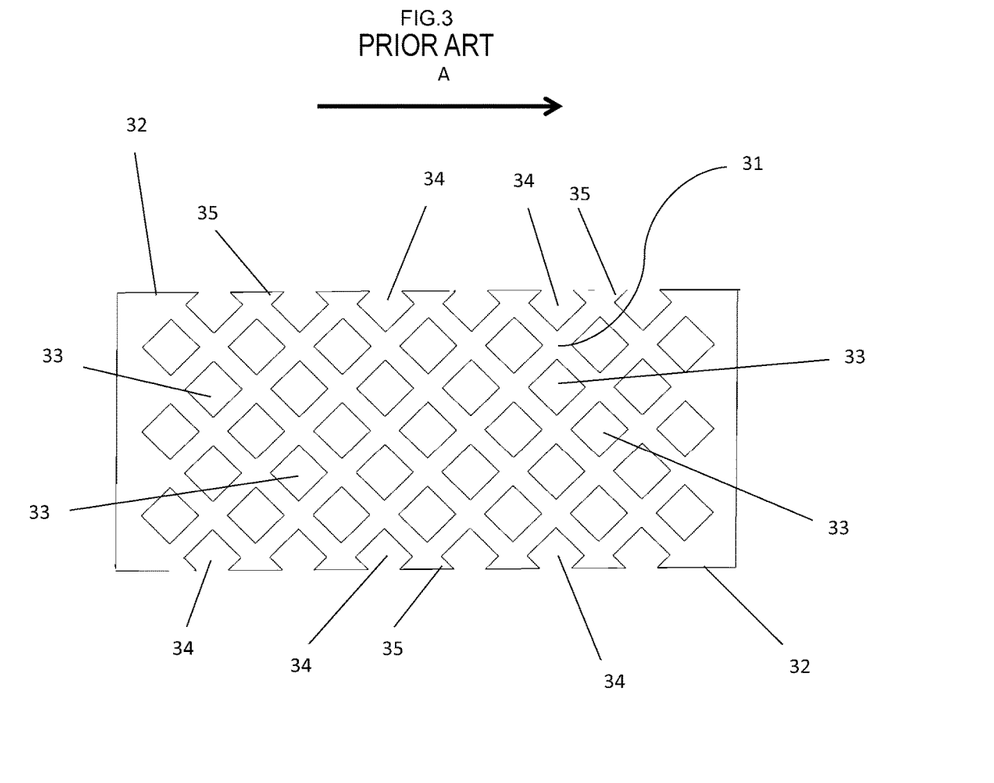
FIG. 3 shows in a second main core passage of a component having an array of pedestals as is known from the prior art.

FIG. 3 shows schematically the geometry of a main core passage of a component having a different array of pedestals as is known from the prior art. It will be appreciated that the geometry is simplified compared to actual products which may comprise more complex shapes in three dimensions but nevertheless can benefit from manufacture in accordance with the invention. The arrangement is shown in first and second rotations, the second representing the passage when turned to remove excess material.

As can be seen a main core passage 31 is bounded by two parallel walls 32 which are arranged orthogonal to a plane on which the component might be built using a powder ALM method. Arrow A shows the direction in which powder would be removed in such a method. An array of pedestals 33, 34 consists of a first plurality 33 of pedestals with a complete diamond-shaped cross section arranged in a central region of the passage 31, and a second plurality 34 which form incomplete diamonds (greater than half-diamonds) which coincide with the walls 32. The second plurality of pedestals 34 intersect with the walls 32 at acute angles having vertices 35. In the lower Figure, it can be seen that, when the component is turned so as to allow powder removal in the direction of arrow A, powder 36 is prone to accrue in the vertices 35.

Figure 4:
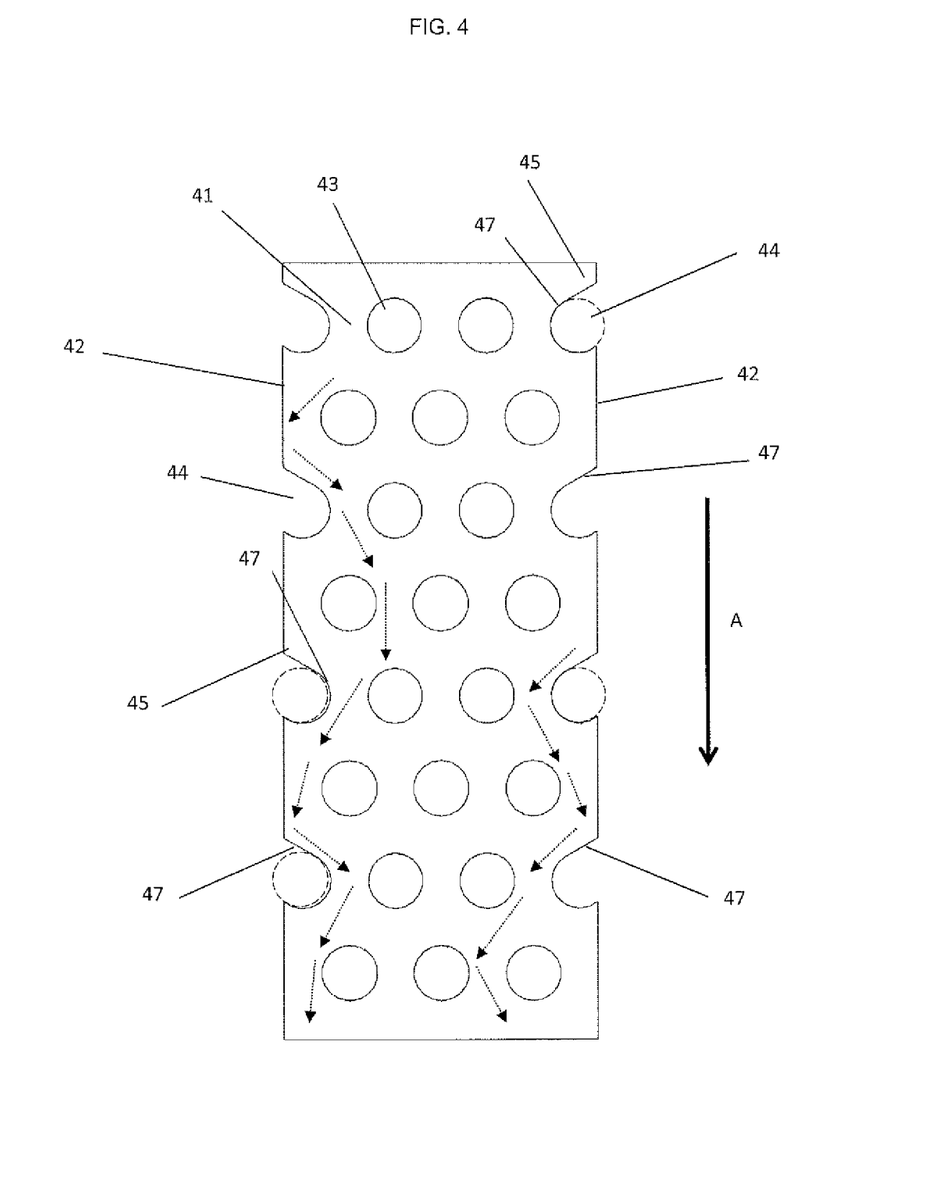
FIG. 4 shows a main core passage of a component made in accordance with a first embodiment of the invention.

FIG. 4 shows schematically the geometry of a main core passage of a component having an array of pedestals broadly similar to that of FIG. 2 but the coinciding pedestals 44 have been altered in accordance with the method of the invention.

As can be seen a main core passage 41 is bounded by two parallel walls 42 which are arranged orthogonal to a plane on which the component has been built using a powder ALM method in accordance with the invention. Arrow A shows the direction in which excess powder is removed in the method. An array of pedestals 43, 44 consists of a first plurality 43 of pedestals with a complete circular cross section arranged in a central region of the passage 41, and a second plurality 44 which coincide with the walls 42. The second plurality of pedestals 44 have been altered from a circular cross section (represented by dotted circle outlines) to extend a face 47 of the pedestal 44 such that it meets the wall 42 at an obtuse angle 45 rather than an acute angle. The dotted arrows show the path taken by powder removed in the powder removal step of the method. As can be seen, powder falling towards the vertex 45 is caused to flow down the incline of altered pedestal face 47 avoiding the entrapment seen in FIG. 2.

Figure 5:
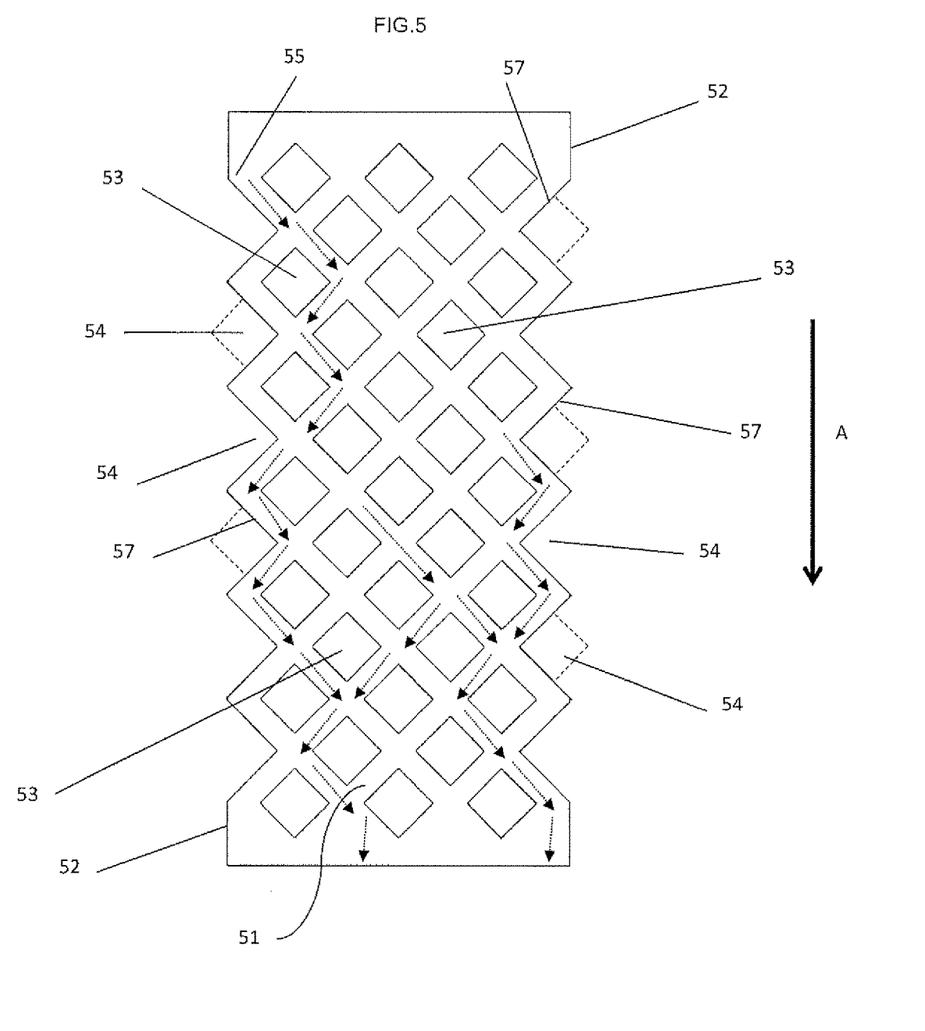
FIG. 5 shows a main core passage of a component made in accordance with a second embodiment of the invention.

FIG. 5 shows schematically the geometry of a main core passage of a component having an array of pedestals broadly similar to that of FIG. 3 but the coinciding pedestals 54 have been altered in accordance with the method of the invention.

As can be seen a main core passage 51 is bounded by two parallel walls 52 which are arranged orthogonal to a plane on which the component has been built using a powder ALM method in accordance with the invention. Arrow A shows the direction in which excess powder is removed in the method. An array of pedestals 53, 54 consists of a first plurality 53 of pedestals with a complete diamond cross section arranged in a central region of the passage 51, and a second plurality 54 which coincide with the walls 52. The second plurality of pedestals 44 have been altered from a diamond cross section (represented by dotted diamond outlines) to extend a face 57 of the pedestal 54 such that it meets the wall 52 at an obtuse angle 55 rather than an acute angle. The dotted arrows show the path taken by powder removed in the powder removal step of the method. As can be seen, powder falling towards the vertex 55 is caused to flow down the incline of altered pedestal face 57 avoiding the entrapment seen in FIG. 5.

It will be noted that a second, oppositely facing face of the diamond has also been extended on the pedestals 54. This makes the component suitable for removal of excess powder in either of two directions, the first as illustrated by arrow A and the second in an opposite direction.

Figure 6:
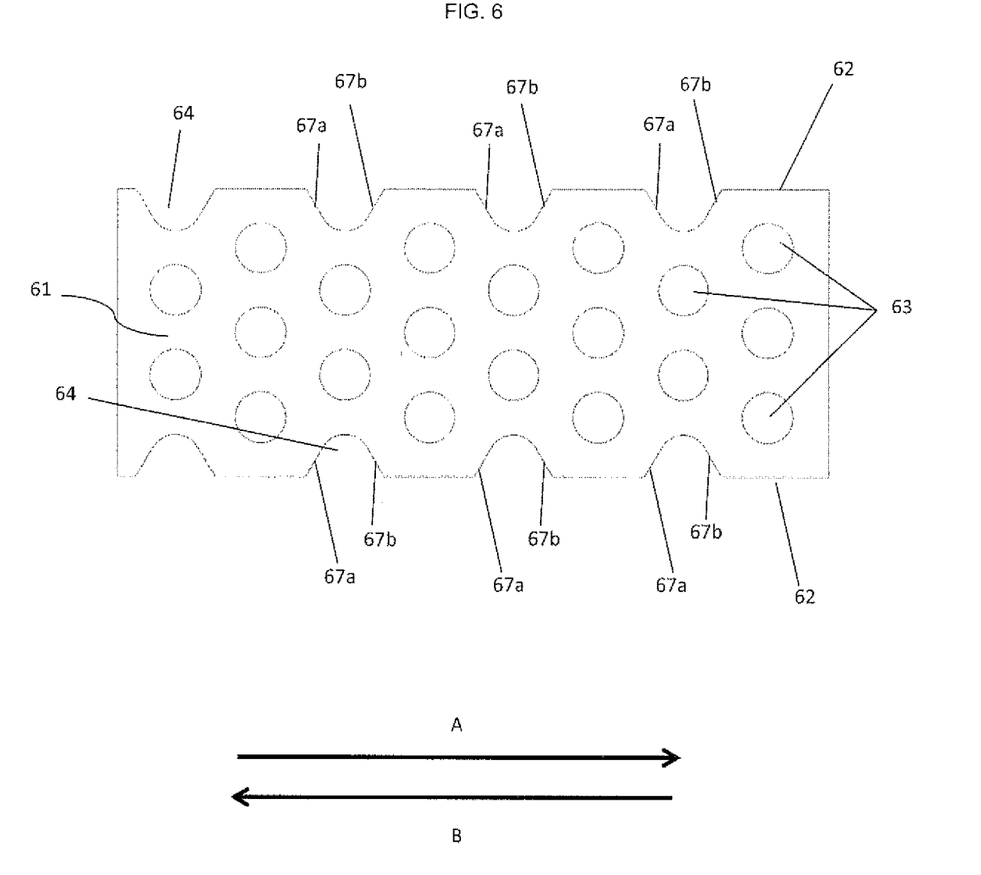
FIG. 6 shows a main core passage of a component made in accordance with a third embodiment of the invention.

FIG. 6 shows a variation of the embodiment of FIG. 4. The Figure shows schematically the geometry of a main core passage of a component having an array of pedestals broadly similar to that of FIGS. 2 and 4 but the coinciding pedestals 64 have been further altered in accordance with the method of the invention.

As can be seen a main core passage 61 is bounded by two parallel walls 62 which are arranged orthogonal to a plane on which the component has been built using a powder ALM method in accordance with the invention. Arrow A shows a first direction in which excess powder is removed in the method. Arrow B shows a second direction in which excess powder is removed in the method. An array of pedestals 63, 64 consists of a first plurality 63 of pedestals with a complete circular cross section arranged in a central region of the passage 61, and a second plurality 64 which coincide with the walls 62. The second plurality of pedestals 64 have been altered from a circular cross section (represented by dotted circle outlines) to extend two oppositely facing faces 67a and 67b of the pedestal 64 such that it meets the wall 62 at an obtuse angle 65 rather than an acute angle. This makes the component suitable for removal of excess powder in either or both of directions A and B as signified by the arrows.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method for the manufacture of a component having an internal cavity and an array of pedestals extending into the cavity, the method comprising;
   defining an external geometry of the component,
   defining a core geometry of the component;
   using a powder bed additive layer manufacturing method, building the component from a plurality of layers laid on a first plane;
   removing excess powder from the core in a first powder extraction direction along the first plane;
   wherein the core geometry includes a main core passage, an array of pedestals extending into the passage from the first plane and a passage wall extending from the first plane, one or more pedestals coinciding with the passage wall, the pedestals in the array having a uniform cross-section in a plane parallel to the first plane except for the coinciding pedestals which have a cross-section in a plane parallel to the first plane which is altered with respect to the uniform cross-section of the non-coinciding pedestals to extend a face of the coinciding pedestal which faces away from the powder extraction direction so as to intersect the passage wall at an obtuse angle.

2. A method as claimed in claim 1 wherein the extended face of the coinciding pedestal is planar.

3. A method as claimed in claim 1 wherein the extended face of the coinciding pedestal is smoothly curved.

4. A method as claimed in claim 1 wherein the vertex of the angle at which the extended face intersects the passage wall is rounded off.

5. A method as claimed in claim 1 wherein the obtuse angle is greater than 105 degrees.

6. A method as claimed in claim 5 wherein the obtuse angle is 135 degrees or greater.

7. A method as claimed in claim 1 wherein excess powder is removed in a second direction and a second face of the coinciding pedestals which faces away from the second direction is also extended so as to intersect the passage wall at an obtuse angle.

8. A method as claimed in claim 7 wherein the second direction is opposite to the first direction.

9. A method as claimed in claim 1 wherein the non-coinciding pedestals are circular in cross section.

10. A method as claimed in claim 1 wherein non-coinciding pedestals are polygonal and have a face which meets the passage wall at an acute angle and the coinciding pedestals are altered such that a different face of the polygonal pedestal is extended.

11. A method as claimed in claim 10 wherein the polygon is a diamond.

12. A method as claimed in claim 1 wherein the pedestals extend orthogonally from the first plane.

13. A method as claimed in claim 1 wherein the pedestals extend at an incline to the first plane.

14. A method as claimed in claim 1 wherein the powder comprises one or more of; a ferrous or non-ferrous alloy or a ceramic.

15. A method as claimed in claim 1 wherein the component is configured for use in a gas turbine engine.

* * * * *